(12) United States Patent
Wang

(10) Patent No.: US 7,327,353 B2
(45) Date of Patent: Feb. 5, 2008

(54) COMPUTER SYSTEM AND RELATED METHOD FOR CALIBRATING A DIGITIZER WITHOUT UTILIZING CALIBRATION SOFTWARE

(75) Inventor: Han-Che Wang, Taipei (TW)

(73) Assignee: ICP Electronics Inc., Shi-Chih, Taipei Hsien (TW)

( * ) Notice: Subject to any disclaimer, the term of this patent is extended or adjusted under 35 U.S.C. 154(b) by 674 days.

(21) Appl. No.: 10/708,868

(22) Filed: Mar. 30, 2004

(65) Prior Publication Data

US 2005/0093831 A1  May 5, 2005

(30) Foreign Application Priority Data

Oct. 29, 2003  (TW) ............................. 92130126 A

(51) Int. Cl.
*G06F 3/045* (2006.01)

(52) U.S. Cl. ........................................ 345/173
(58) Field of Classification Search ........ 345/173–178, 345/903, 904; 715/856
See application file for complete search history.

(56) References Cited

U.S. PATENT DOCUMENTS

| 4,710,758 | A | * | 12/1987 | Mussler et al. | 345/178 |
| 4,752,655 | A | * | 6/1988 | Tajiri et al. | 345/174 |
| 4,903,012 | A | * | 2/1990 | Ohuchi | 345/178 |
| 5,831,597 | A | * | 11/1998 | West et al. | 345/163 |
| 6,262,718 | B1 | * | 7/2001 | Findlay et al. | 345/178 |
| 6,353,434 | B1 | * | 3/2002 | Akebi et al. | 345/173 |

* cited by examiner

*Primary Examiner*—Amr A. Awad
*Assistant Examiner*—Randal L Willis
(74) *Attorney, Agent, or Firm*—Winston Hsu

(57) ABSTRACT

A computer system includes a screen for displaying images, a central processing unit (CPU) for controlling the operation of the computer system, an on-screen display (OSD) circuit electrically connected to the CPU and the screen for controlling the screen to display a plurality of test marks according to a plurality of predetermined coordinate values, a touch panel installed parallel to the display face of the screen for generating a plurality of test sensing signals according to positions at which it is triggered, and a control circuit electrically connected to the touch panel and the CPU for calibrating the coordinate values converted by the control circuit from the sensing signals generated by triggering the touch panel, according to the plurality of predetermined coordinate values and the plurality of test sensing signals.

8 Claims, 4 Drawing Sheets

COMPUTER SYSTEM AND RELATED METHOD FOR CALIBRATING A DIGITIZER WITHOUT UTILIZING CALIBRATION SOFTWARE

BACKGROUND OF INVENTION

1. Field of the Invention

The present invention relates to a computer system and related method for calibrating a digitizer, and more specifically, to a computer system and related method for calibrating a digitizer without utilizing calibration software.

2. Description of the Prior Art

As the semiconductor manufacturing process progresses, an integrated circuit (IC) can contain more transistors for more complicated logic operations, and the operating ability of computers increases accordingly. Additionally, control signal input is quite important for users. From keyboard, mouse to trackball, as electronic products become more and more compact in size, digitizers have become an important input device in the next generation as they combine keyboard, mouse and handwriting input abilities. Using a digitizer, users can easily control a cursor or input characters in the handwritten way. Moreover, a touch screen combining input (digitizer) and output (screen) will provide a convenient input system.

Please refer to FIG. 1 showing a block diagram of a conventional computer system 10. The computer system 10 includes a host computer 12, a screen 14 and a digitizer 16. The host computer 12 has a central processing unit (CPU) 18, a north bridge circuit 20, a south bridge circuit 22, a display drive circuit 24, a memory 26 and a hard disk drive (HDD) 28. The digitizer 16 has a touch panel 29 and a control circuit 30, and the HDD 28 stores program codes of digitizer calibration software 32 and operating system (OS) 34. The CPU 18 is used for controlling the operation of the computer system 10, the north bridge circuit 20 is used for assisting data transmission between the CPU 18 and high-speed peripherals (e.g. the display drive circuit 24 and the memory 26), and the south bridge circuit 22 is used for assisting data transmission between the north bridge circuit 20 and low-speed peripherals (e.g. the HDD 28 and the digitizer 16). The display drive circuit 24 (e.g. a VGA card) is used for outputting video signals according to display data in order to drive the screen 14 to display images. The memory 26 is a volatile storage, and the HDD 28 is a non-volatile storage. The digitizer 16 is used for inputting control signals (e.g. cursor signals and character signals). If the touch panel 29 is a type of electro-resistive one, the user can press the touch panel 29 to generate sensing signals (e.g. voltage levels) to the control circuit 30, and then the control circuit 30 converts the sensing signals into corresponding coordinate values and sends them back to the host computer 12. Similarly, if the touch panel 29 is a type of electromagnetic one, the user can also generate sensing signals to be sent to the control circuit 30 by using the touch panel 29.

As known in the industry, the digitizer 16 requires calibration in cooperation with the screen 14 in order to convert the sensing signals accurately into coordinate values. Therefore, digitizer calibration software 32 stored on the HDD 28 is activated by the OS 34 in the host computer 12, and loaded to the memory 26 via the south bridge circuit 22. After the CPU 18 executes the program code for the digitizer calibration software 32, the digitizer calibration software 32 will generate display data, which is transmitted to the display drive circuit 24 via the north bridge circuit 20. The display drive circuit 24 continuously drives the screen 14 to display a calibration chart according to the display data. Please refer to FIG. 2 showing a calibration chart 36 on the screen 14 shown in FIG. 1. In FIG. 2, the calibration chart 36 includes a plurality of test marks 38, and each test mark 38 corresponds to a specific coordinate value on the screen 14. For instance, if the resolution of the screen 14 is 1024*768, the test marks 38 are located at the four corners having coordinate values (0, 0), (0, 768), (1024, 0), (1024, 768) of the screen 14 as shown in FIG. 2. Subsequently, the user can trigger corresponding sensing signals using the touch panel 29 according to the test marks, and the control circuit 30 converts the sensing signals into corresponding coordinate values A, B, C, D. Finally, the control circuit 30 calibrates these coordinate values input into the host computer according to the deviation between the coordinate values A, B, C, D and the coordinate values (0, 0), (0, 768), (1024, 0), (1024, 768). Therefore, after calibration is finished, when the user triggers corresponding sensing signals via the touch panel 29, the control circuit 30 can transmit the coordinate values (0, 0), (0, 768), (1024, 0), (1024, 768) accurately to the host computer 12.

As described above, the conventional computer system 10 uses the digitizer calibration software 32 to control the display drive circuit 24 to drive the screen 14, in order to display the calibration chart 36 with the test marks 38 thereon. That is, before the calibration of digitizer 16, the user is required to install the digitizer calibration software 32 into the computer system 10. Since different OS 34 utilizes different application program interface (API) functions, a digitizer calibration software 32 compatible with a specific OS cannot be installed or applied under another OS. For example, the digitizer calibration software 32 compatible with Windows™ can not be applied under the OS of Macintosh™. Furthermore, inappropriate digitizer calibration software 32 may cause malfunction or unstability of the computer system 10. Therefore, problems remain when calibrating the digitizer 16 using software.

SUMMARY OF INVENTION

It is therefore a primary objective of the present invention to provide a calibration system and method to calibrate a digitizer without using calibration software, in order to solve the problems in the prior art.

A computer system includes a screen for displaying images, a central processing unit (CPU) for controlling the operation of the computer system, an on-screen display (OSD) circuit electrically connected to the CPU and the screen for controlling the screen to display a plurality of test patterns according to a plurality of predetermined coordinate values, a touch panel installed parallel to the display face of the screen for generating a plurality of test sensing signals according to positions at which it is triggered, and a control circuit electrically connected to the touch panel and the CPU for calibrating the coordinate values converted by the control circuit from the sensing signals generated by triggering the touch panel, according to the plurality of predetermined coordinate values and the plurality of test sensing signals.

The present invention further provides a method for calibrating coordinate values generated by a touch panel. The method includes steps of (a) utilizing a plurality of predetermined coordinate values to control a screen to display a plurality of test marks by means of on-screen display (OSD), (b) generating a plurality of test coordinate values according to positions at which a touch panel is triggered, and (c) calibrating the coordinate values of sensing signals generated by triggering the touch panel according to the plurality of predetermined coordinate values and the plurality of test coordinate values.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
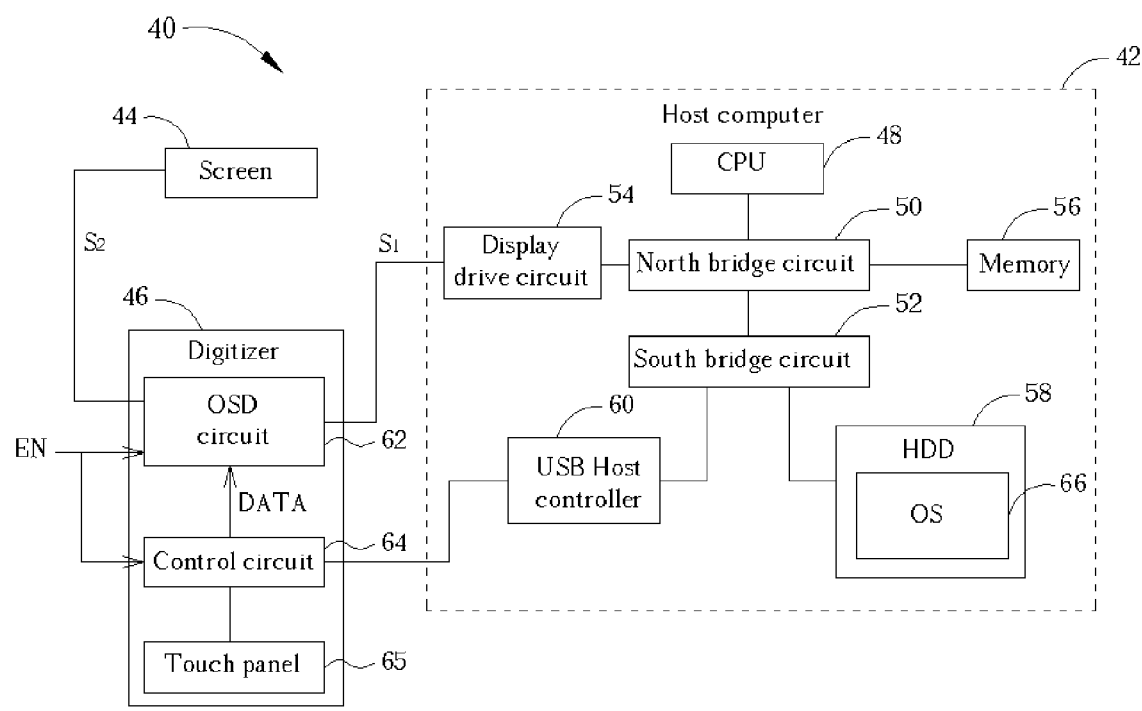
FIG. 3 is block diagram of a computer system according to the present invention

Please refer to FIG. 3 showing a block diagram of a computer system 40 according to the present invention. The computer system 40 includes a host computer 42, a screen 44 and a digitizer 46. The host computer 42 has a CPU 48, a north bridge circuit 50, a south bridge circuit 52, a display drive circuit 54, a memory 56, a HDD 58, and a USB host controller 60. The digitizer 46 has an on-screen display (OSD) circuit 62, a control circuit 64 and a touch panel 65. The HDD 58 stores the program codes for OS 66. The CPU 48 is used for controlling the operation of the computer system 40, the north bridge circuit 50 is used for coordinating data transmission between the CPU 48 and high-speed peripherals (e.g. the display drive circuit 54 and the memory 56), and the south bridge circuit 52 is used for coordinating data transmission between the north bridge circuit 50 and low-speed peripherals (e.g. the HDD 58 and the digitizer 46). The display drive circuit 54 (e.g. a VGA card) is for outputting video signals S1 according to display data in order to drive the screen 44 to display images. The memory 56 is a volatile storage and the HDD 58 is a non-volatile storage. The digitizer 46 is used for inputting control signals. For instance, if the touch panel 65 is electro-resistive, the user can press the touch panel 65 to generate sensing signals sent to the control circuit 64, and then the control circuit 64 converts the sensing signals into corresponding coordinate values and sends them back to the host computer 42. In the present embodiment, the digitizer 46 is connected to the USB host controller 60 of the host computer 42 via USB interface. Therefore, after the host computer 42 is booted and the OS 66 is loaded, the coordinate values output by the control circuit 64 are transmitted to the OS 66, executed by the host computer 42, via the USB host controller 60, so that the OS 66 is notified of the cursor signals input by the user.

In the present embodiment, when the user triggers an enabling signal EN to the OSD circuit 62 and the control circuit 64, the OSD circuit 62 and the control circuit 64 start the calibration of the digitizer 46. For example, the user presses a button on a housing of the digitizer 46 to input the enabling signals EN, and then the user can trigger the OSD circuit 62 and the control circuit 64 to execute the calibration of the digitizer 46, which modifies the error generated during the conversion of the sensing signals to the corresponding coordinate values. When the OSD circuit 62 executes the calibration, it can adjust the video signal S1 to output another video signal S2, and drive the screen 44 by the video signal S2. Thus, the video signal S2 drives the screen 44 to display a predetermined picture (such as a paragraph or a menu) overlaying a predetermined image corresponding to the video signal S1. If the OSD circuit 62 is not executing the calibration, the OSD circuit 62 will not adjust the video signal S1 but directly output it to the screen 44. In this case, the video signal S2 is equivalent to the video signal S1, so that the screen 44 can output the predetermined image according to the video signal S1.

Figure 4:
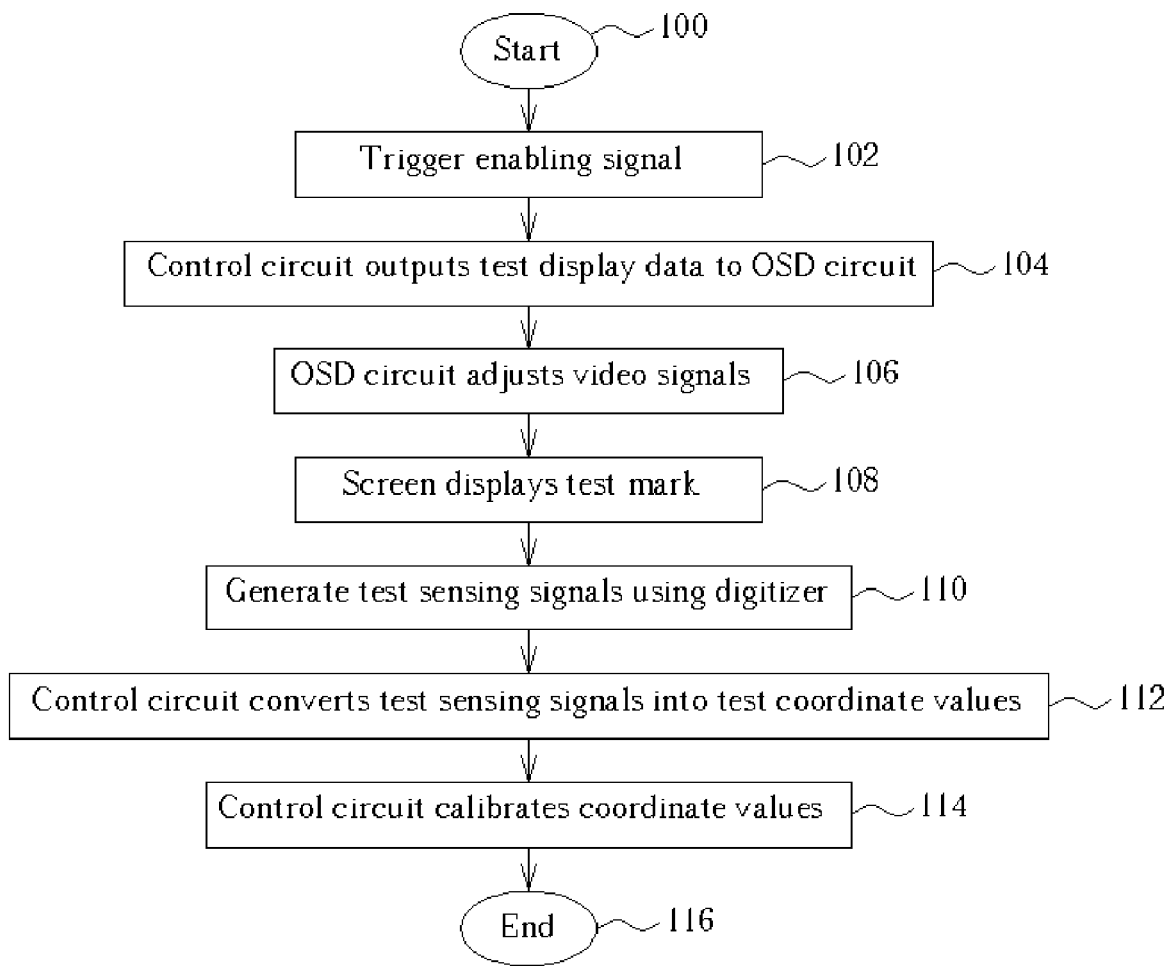
FIG. 4 is a flowchart of the calibration of the digitizer shown in FIG. 3.

Please refer to FIG. 4 showing a flowchart of the calibration of the digitizer 46 shown in FIG. 3 as follows:

Step 100: Start.

Step 102: The user triggers the enabling signal EN using the button to drive both the OSD circuit 62 and the control circuit 64 to execute the calibration.

Step 104: The control circuit 64 outputs test display data to the OSD circuit 62.

Step 106: The OSD circuit 62 adjusts the video signal S1 according to the test display data, and outputs the video signal S2 to the screen 44.

Step 108: The screen 44 displays a test mark corresponding to the test display data at a predetermined screen coordinate position, according to the video signal S2.

Step 110: The user controls the digitizer 46 to generate corresponding test sensing signals according to the test mark.

Step 112: The control circuit 64 reads the test sensing signals and converts the test sensing signals into test coordinate values according to a predetermined conversion relationship.

Step 114: The control circuit 64 calibrates the predetermined conversion relationship according to the test coordinate values and the predetermined screen coordinate position, and converts the sensing signals output by the digitizer 46 into coordinate values according to the calibrated conversion relationship.

Step 116: End.

Figure 1:
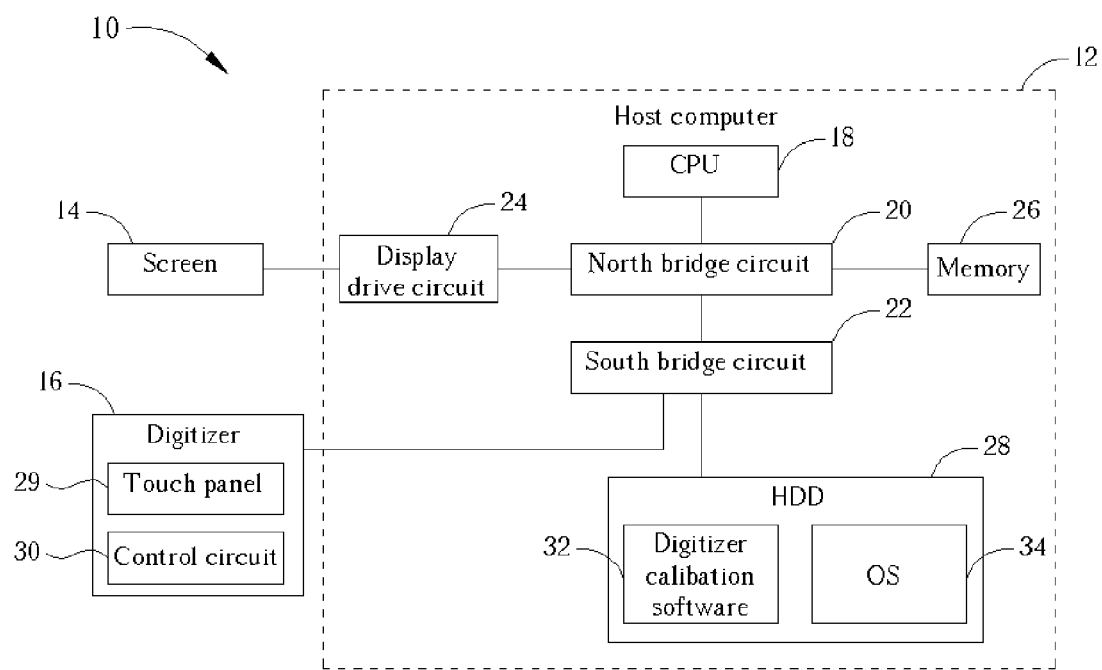
FIG. 1 is a block diagram of a conventional computer system.
Figure 2:
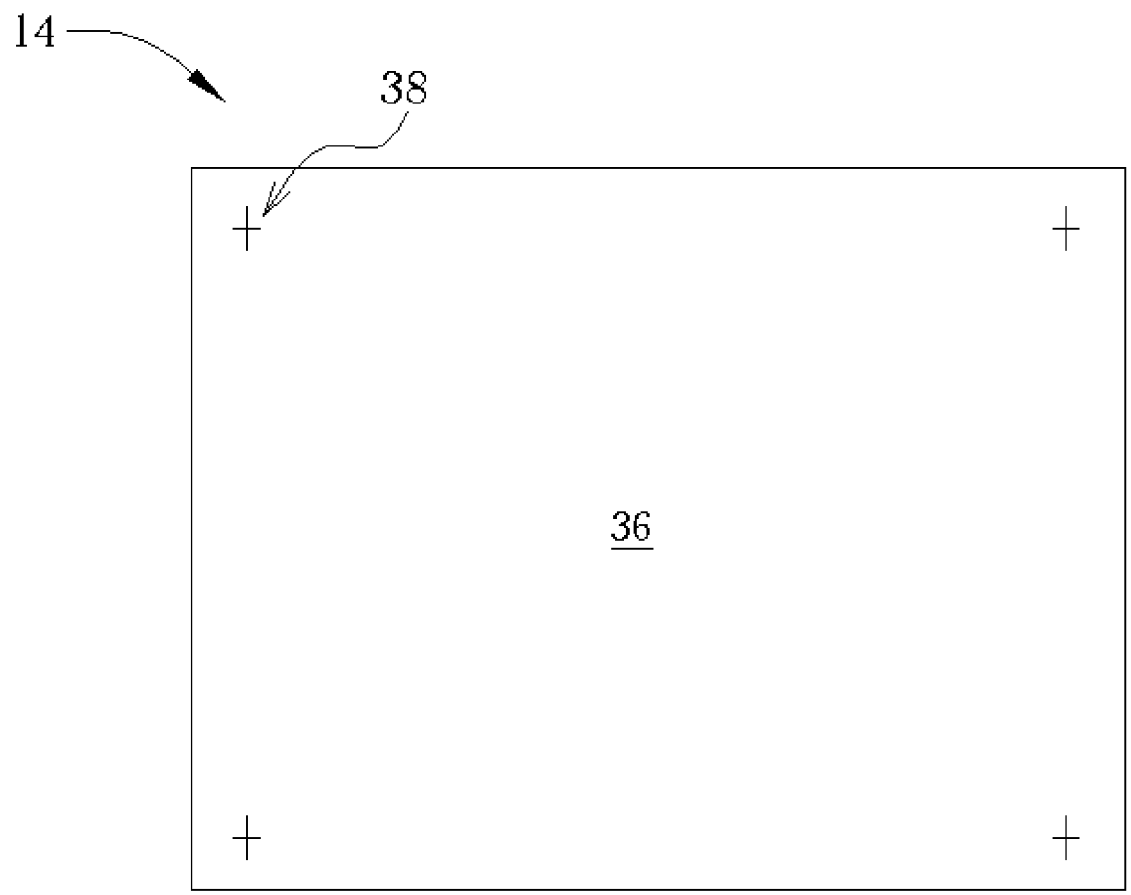
FIG. 2 is a calibration chart on the screen shown in FIG. 1.

The calibration of the digitizer 46 is described as follows. First, the user presses the button to trigger the enabling signal EN, so that the OSD circuit 62 and the control circuit 64 start the calibration process (Step 102). In the present embodiment, after executing the calibration, the control circuit 64 can determine the resolution of the screen 44 by reading the video signal S1 output by the display drive circuit 54. Thus, after recognizing the resolution of the screen 44, the control circuit 64 can accurately control the OSD circuit 62 in order to drive the screen 44 to display the test mark at a reasonable pixel position. That is, the control circuit 64 outputs the test display data to the OSD circuit 62 according to the resolution of the screen 44, wherein the test display data corresponds to the test mark, the test mark is used to assist the user to calibrate the digitizer 46. We note that although the test mark shown in FIG. 2 appears a cross type, other test marks having the same function are also applicable to the present invention. Since the video signal S1 corresponds to a predetermined image so that it cannot directly drive the screen 44 to display the required test mark, after the OSD circuit 62 receives the test display data, the OSD circuit 62 adjusts the video signal S1 according to the test display data, so that the video signal S2 can drive the screen 44 to display the required test mark at a proper pixel position (Step 106). That is, for the screen 44 driven by the video signal S2, the required test mark will overlay on the predetermined image corresponding to the video signal S1 (Step 108). Subsequently, the user generates corresponding sensing signals using the digitizer 46 according to the test mark displayed on the screen 44 (Step 110). For instance, in order to trigger the touch panel 65 to generate corresponding test sensing signals to the control circuit 64, the user can press corresponding positions on the touch panel 65 according to the test marks on the screen 44 (e.g. the test marks 38 shown in FIG. 2). Finally, the control circuit 64 converts the test sensing signals into the test coordinate values corresponding to the test marks (Step 112). For example, the control circuit 64 has an analog-to-digital converter (ADC) to convert analog test sensing signals into required digital test coordinate values.

Since the test display data output by the control circuit 64 is used for displaying the test mark at the predetermined position coordinate of the screen, assuming that two test marks are respectively displayed at two different positions $(X_1, Y_1)$, $(X_2, Y_2)$ on the screen 44. However, the test sensing signals generated by the digitizer 46 are converted into positions $(X_1', Y_1')$, $(X_2', Y_2')$. In other words, the coordinate values generated by the digitizer 46 according to the test patterns which deviate from the coordinate values corresponding to the test marks on the screen 44. Therefore, the control circuit 64 in the present embodiment utilizes the conventional interpolation method to adjust the coordinate values output to the host computer 42 according to positions $(X_1, Y_1)$, $(X_2, Y_2)$, $(X_1', Y_1'')$, $(X_2', Y_2')$ (Step 114). In other words, after the calibration is finished, if the user uses the digitizer 46 to click position $(X_3, Y_3)$ on the screen 44, the sensing signal generated by the digitizer 46 is converted by the control circuit 64 into a coordinate value corresponding to position $(X_3', Y_3')$, and then the control circuit 64 executes the interpolation method according to the positions obtained during the calibration $(X_1, Y_1)$, $(X_2, Y_2)$, $(X_1', Y_1')$, $(X_2', Y_2')$ in order to further modify the incorrect coordinate value $(X_3', Y_3')$. Finally, the control circuit 64 transmits the correct coordinate value $(X_3, Y_3)$ to the host computer 42.

As known in the industry, the digitizer 46 generates absolute coordinates, and USB supports transmission of such kind of absolute coordinates. Therefore, in the present embodiment, since the control circuit 64 is connected to the host computer 42 via USB interface (i.e. to transmit coordinate values via USB interface), no additional driver installation is required for the digitizer 46, and the coordinate values can be transmitted to the host computer 42 based on the protocol provided by USB drivers. However, in cooperation with other drivers, the digitizer 46 can also utilize other transmission interfaces instead of USB, which also fall into the scope of the present invention. In addition, as shown in FIG. 3, the OSD circuit 62 can be installed in the digitizer 46. However, the OSD circuit 62 can also be installed in the screen 44 or the display drive circuit 54, in order to adjust the video signal S1 before the video signal S1 drives the screen 44, and to generate the video signal S2 for driving the screen 44 to display the test patterns, as described above.

In contrast to the prior art, the calibration method according to the present invention utilizes a hardware circuit (i.e. OSD circuit) to drive the screen to display the test marks required for the calibration, thus no calibration software is required in the host computer. Therefore, calibration according to the present invention can be applied for computer systems using any OS. Moreover, since no software in the host computer is required, the unstability due to software execution is effectively prevented.

Those skilled in the art will readily observe that numerous modifications and alterations of the device and the method may be made while retaining the teachings of the invention. Accordingly, the above disclosure should be construed as limited only by the metes and bounds of the appended claims.

What is claimed is:

1. A computer system, comprising:
    a screen for displaying images;
    a central processing unit (CPU) for controlling the operation of the computer system;
    an on-screen display (OSD) circuit electrically connected to the CPU and the screen, for controlling the screen to display a plurality of test marks according to a plurality of predetermined coordinate values;
    a touch panel installed parallel to the display face of the screen, for generating a plurality of test sensing signals according to positions at which it is triggered;
    a display drive circuit electrically connected to the CPU and the OSD circuit for generating video drive signals to drive the screen, wherein the OSD circuit controls the video drive signals to drive the screen to display the test marks; and
    a control circuit electrically connected to the touch panel and the CPU, for calibrating the coordinate values converted by the control circuit from the sensing signals generated by triggering the touch panel, according to the predetermined coordinate values and the test sensing signals.

2. The computer system of claim 1, wherein the video drive signals are used for driving the screen to display a predetermined image, and the OSD circuit controls the video drive signals to overlay the test marks on the predetermined image.

3. The computer system of claim 1, wherein the control circuit reads signals from the display drive circuit to determine the resolution of the screen and controls the predetermined coordinate values according to the resolution of the screen.

4. The computer system of claim 1, wherein the control circuit utilizes a universal serial bus (USB) to transmit the sensing signals generated by triggering the touch panel to the CPU.

5. The computer system of claim 1, wherein the touch panel is an electro-resistive touch panel.

6. The computer system of claim 1, wherein the touch panel is an electromagnetic touch panel.

7. The computer system of claim 1, wherein the control circuit converts the test sensing signals into a plurality of test coordinate values, and calibrates the coordinate values converted by the control circuit from the sensing signals generated by triggering the touch panel, according to the predetermined coordinate values and the test coordinate values.

8. The computer system of claim 1, wherein the control circuit outputs test display data to the OSD circuit, and the OSD circuit generates the predetermined coordinate values according to the test display data.

* * * * *